(No Model.)

E. J. DURANT.
FILTER.

No. 560,261. Patented May 19, 1896.

Witnesses:
F. T. Johnson.
F. M. Townsend.

Inventor:
Edward J. Durant
by Hazard & Townsend
his attys

UNITED STATES PATENT OFFICE.

EDWARD J. DURANT, OF PASADENA, CALIFORNIA.

FILTER.

SPECIFICATION forming part of Letters Patent No. 560,261, dated May 19, 1896.

Application filed September 10, 1895. Serial No. 562,045. (No model.)

*To all whom it may concern:*

Be it known that I, EDWARD J. DURANT, a citizen of the United States, residing at Pasadena, in the county of Los Angeles and State of California, have invented a new and useful Improvement in Filters, of which the following is a specification.

My invention relates to portable filters which are adapted to be screwed upon a water-supply faucet to filter the water as it comes from the service-pipe; but it is also applicable for filters comprising a filtering vessel proper, to which my invention may be applied as an adjunct.

The object of my invention is to provide a superior filter of this character which, while being of very simple construction, is provided with different filtering substances of different grades of fineness, arranged in proper succession, and which filter can be easily, readily, and thoroughly cleansed of impurities.

The accompanying drawings illustrate my invention.

Figure 1:
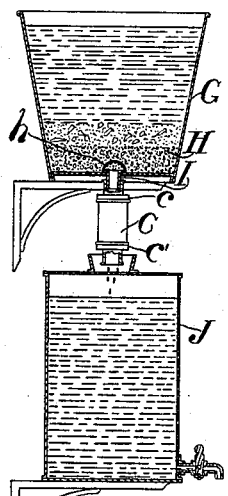
Figure 5:
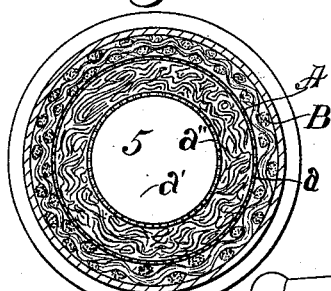
Figure 6:
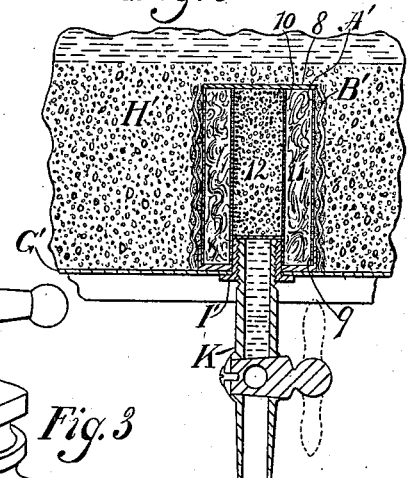
Figure 2:
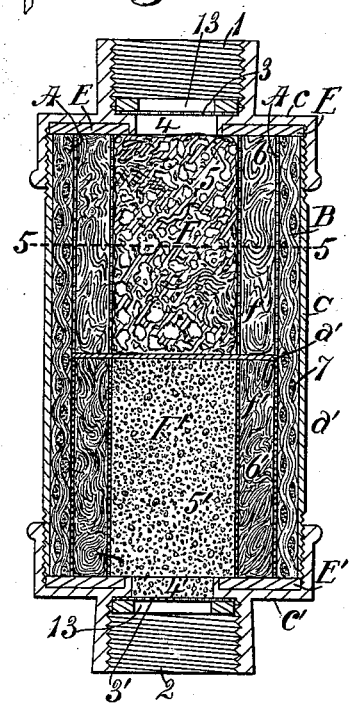
Figure 4:
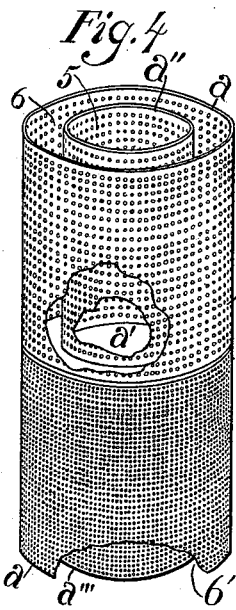
Figure 3:
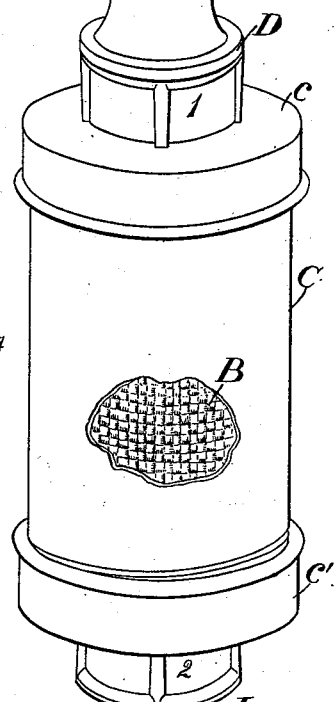

Figure 1 is a vertical mid-section showing the application of my invention as an adjunct for a vessel provided with filtering substances. My improvement is shown intact. Fig. 2 is a longitudinal mid-section of my invention as applied in a device for attachment to a faucet. Fig. 3 is a perspective view of the faucet-filter attached to a faucet. The case is broken to expose the filtering-jacket. Fig. 4 is a perspective view of the tubular holder for the filtering material. It is partly broken to show the structure. Fig. 5 is a transverse section on line indicated by 5 5, Fig. 2. Fig. 6 indicates a vertical mid-section of another form for use in an outlet from a vessel provided with filtering material.

My invention comprises a new combination in a filter—a hollow permeable holder A and a jacket B, formed of a tube of a fabric of suitable filtering material fitted upon the outside of the holder. This combination is used in various ways, which I will hereinafter describe, so as to cause the water or other liquid which is to be filtered to pass through the jacket and permeable holder either from the outside into the holder and thence out at the end of the holder or from the inside of the holder outward through the jacket. This tubular jacket is adapted to be conveniently removed for cleaning and can easily be replaced.

My invention also comprises the combination of the hollow permeable holder having a series of compartments for holding filtering material, the filtering jacket B fitted around the holder, filtering material arranged in the several compartments, and means for introducing the liquid to be filtered into one of the compartments and means for causing it to pass to another or other compartments and find its way through the filtering-jacket in its passage through the filter.

My invention also comprises the particular form of filtering-material holder herein shown and the combination of the several elements, which go to make up my newly-invented filter.

The holder for the jacket and filtering material, which I have shown in Figs. 2, 4, and 5, is composed of an outer open-ended tube $a$ of perforated sheet metal, an impermeable partition $a'$, arranged across the tube between its ends, one or more inner tubes $a''$ $a'''$, arranged within the outer tube so that the partition $a'$ and the tubes $a''$ $a'''$ and the outer tube $a$ constitute a holder for filtering material, provided with a series of compartments into which the filtering material may be packed, and at the same time the holder is adapted to hold the filtering-jacket B in position for filtering the liquid which passes out through the walls of the holder or in through such walls. The tubes are preferably cylindrical, but may be of square or other cross-section, if desired. The outer tube $a'$ is perforated, and the part which is on the side of the partition next to the inlet 4 has larger perforations than the part which is on the side of the partition next to outlet 4'.

C indicates an impermeable outer case to fit upon and contain the holder with its jacket. The tube of filtering fabric is fitted upon the outside of the perforated tube and is fitted into the outer or containing case, and, contacting with the walls of such case, forms a permeable closure of the passage around the impermeable portion and between the permeable tube and the containing case, so that the liquid, in passing through the filter, must pass through the jacket lengthwise of its fabric, as distinguished from merely passing through from side to side thereof.

*c* and *c'* indicate caps screwed onto the opposite ends of the case C and provided with screw-threaded sockets 1 2, which can be screwed upon the hose-bib D, through which the water is drawn from the service-pipe.

3 3' indicate perforated plates or strainers arranged in the caps and secured by washers 13, or other suitable means. These are designed to strain the coarsest impurities from the water before it reaches the interior of the filter. They also serve to retain any filtering material which might come out through the passages 4 and 4'. The inlet and outlet 4 4' of the caps communicate, respectively, with the innermost compartments 5 5' of the holder, so that the liquid which enters through the cap *c* will first come into the compartment 5 and will thence pass outward through the compartment 6 and thence into the jacket B, which is contained in the compartment 7, which surrounds the holder within the containing-case C. Thence the water will pass into compartment 6', and thence into the compartment 5', and thence out through the passage 4'.

The jacket B is preferably made of a tube of woven asbestos, but a jacket of other filtering substance may be used without departing from the spirit of my invention. Asbestos cloth is considered superior for use for the jacket because it can be purified by fire without being destroyed, thus affording perfect means for destroying the microbes and other impurities which may find lodgment therein.

E E' indicate packings of rubber or other suitable material arranged in the caps, whereby the caps are fitted water-tight against the ends of the tubes *a a'' a'''* to prevent the liquid from flowing into the outer compartments without passing through the filtering material. The several compartments 5, 6, 6', and 5' are filled with filtering material F F' *f f'* of different characters and grades of fineness. A very suitable material for filling the inlet-compartment 5 is sponge, as shown at F, for catching the coarser impurities which enter the filter, and a very suitable material for the compartment 6 is asbestos fiber *f*. The material in compartments 6' and 5' may be more compact. The material F'' in compartment 5' may be fine charcoal or sand. It is to be understood that any suitable material may be used in these several compartments.

In Fig. 1, G indicates a vessel containing filtering material H. I indicates a tubular outlet on which the socket of the cap *c* is secured. J indicates a vessel into which the water drips.

In Fig. 6, G' indicates a vessel provided with filtering material H'. I' indicates an internally-screw-threaded tube in the bottom of the vessel, from which the faucet K, which is screwed into the tube I', leads. A' indicates the filter-holder, which is capped over the top with an impermeable cap 8. 9 and 10 respectively indicate permeable tubes fastened to the cap 8. The jacket B', similar to jacket B, is fitted upon the outer tube 9, and filtering material 11 and 12 is placed in the interior compartments.

The practical operation of the form of my invention shown in Figs. 2 and 3, when fastened on the bib, as shown in Fig. 3, is as follows: The water from the hose-bib D will flow through the inlet 4 into the chamber 5 and thence laterally to the jacket, and then will flow along the length of the jacket until it passes the partition *a'*. Then it flows laterally through the filtering-compartment 6' into the compartment 5' and then out through the outlet 4'.

To thoroughly cleanse the filter it may be removed from the faucet or bib and the caps unscrewed. Then the filtering material can be removed, the holder can be withdrawn from the case, and the jacket from the holder. If the jacket is woven of asbestos, it can be put into fire and all impurities burned, and it can also be washed. If the jacket is made of combustible material, it will simply be washed. The other filtering material can be washed or otherwise cleansed, or it may be replaced with fresh material.

In the form shown in Fig. 1 the water will flow down through the filtering material and then through the perforated cap *h* and tube I and then through the filter in the manner just described. This form is designed for water containing algæ or other coarse impurities.

In the form shown in Fig. 6 the water will flow through the filtering material H', through the jacket B' and the permeable holder and the filtering material therein, and thence out through the faucet K'.

The filter shown in Figs. 2 and 3 is peculiarly adapted for rinsing by reversing the filter upon the bib. When the cap *c'* is screwed upon the bib and the water turned through the filter, the impurities contained in the filter are easily washed out, for the reason that as the water passes through the filter it comes to more and more open material and the impurities which have lodged from water going through the filter in the other direction are easily washed out at the larger openings.

Now, having described my invention, what I claim as new, and desire to secure by Letters Patent, is—

1. A portable filter comprising an open-ended perforated tube provided with an impermeable partition between its ends; a containing-case; a removable tube of fabric of suitable filtering material fitted upon the outside of the perforated tube, and fitted into the containing-case and contacting with the walls of the case; and the caps respectively provided with an inlet and an outlet and removably fastened to the ends of the case substantially as and for the purpose set forth.

2. The combination of the holder comprising a permeable open-ended tube and an impermeable partition between the ends of such tube; filtering material in the tube a jacket of filtering material fitted upon the permeable tube; the case fitted upon such jacket and the caps fitted on the ends of the case against the ends of the tube and against the said filtering material, and provided with a centrally-arranged inlet and outlet substantially as set forth.

3. The filter set forth, comprising the hollow permeable holder having a series of compartments for holding filtering material; the filtering-jacket fitted around the holder; filtering material arranged in the several compartments; and means for introducing the liquid to be filtered into one of the compartments and means for causing it to pass to another or other compartments and find its way through the filtering-jacket in its passage through the filter.

4. The combination of the holder composed of outer and inner permeable tubes and an impermeable partition arranged across the tubes between the ends of the holder so that the partition and the tubes constitute a holder having several compartments; filtering material arranged in the compartments; a jacket of filtering material fitted around the holder; a case fitted upon such jacket; and caps for the ends of the case, provided respectively with the inlet and outlet passages.

5. The filter set forth comprising the perforated tube having the partition between its ends and having the perforations on one side of the partition larger than those on the other side of the partition; the filtering-jacket fitted around the tube; the case inclosing the jacket; the caps on the ends of the case and provided with the inlet and outlet, respectively; and filtering material within the tube.

EDWARD J. DURANT.

Witnesses:
JAMES R. TOWNSEND,
F. M. TOWNSEND.